(12) United States Patent
Bierman et al.

(10) Patent No.: US 10,272,960 B2
(45) Date of Patent: Apr. 30, 2019

(54) NITRIDED TRACK PIN FOR TRACK CHAIN ASSEMBLY OF MACHINE

(71) Applicant: Caterpillar Inc., Peoria, IL (US)

(72) Inventors: Robert Bierman, Peoria, IL (US); Robert Meyer, Metamora, IL (US); Zachary S. Birky, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 190 days.

(21) Appl. No.: 15/292,985

(22) Filed: Oct. 13, 2016

(65) Prior Publication Data

US 2017/0129556 A1 May 11, 2017

Related U.S. Application Data

(63) Continuation-in-part of application No. 14/933,467, filed on Nov. 5, 2015, now abandoned.

(51) Int. Cl.

| | | |
|---|---|---|
| *C23C 8/26* | (2006.01) |
| *B62D 55/21* | (2006.01) |
| *C22C 38/38* | (2006.01) |
| *C22C 38/34* | (2006.01) |
| *C22C 38/28* | (2006.01) |
| *C22C 38/24* | (2006.01) |
| *C22C 38/22* | (2006.01) |
| *C22C 38/06* | (2006.01) |
| *C22C 38/04* | (2006.01) |
| *C22C 38/02* | (2006.01) |
| *C22C 38/00* | (2006.01) |
| *C21D 9/00* | (2006.01) |
| *C21D 8/00* | (2006.01) |
| *C21D 1/18* | (2006.01) |
| *C21D 1/58* | (2006.01) |
| *C21D 1/60* | (2006.01) |
| *C21D 8/02* | (2006.01) |
| *C21D 8/10* | (2006.01) |
| *C21D 9/08* | (2006.01) |
| *C21D 9/46* | (2006.01) |
| *B62D 55/06* | (2006.01) |
| *E02F 3/76* | (2006.01) |

(52) U.S. Cl.
CPC ............ *B62D 55/21* (2013.01); *C21D 1/18* (2013.01); *C21D 1/58* (2013.01); *C21D 1/60* (2013.01); *C21D 8/005* (2013.01); *C21D 8/0205* (2013.01); *C21D 8/0221* (2013.01); *C21D 8/0247* (2013.01); *C21D 8/0257* (2013.01); *C21D 8/105* (2013.01); *C21D 9/0068* (2013.01); *C21D 9/0081* (2013.01); *C21D 9/08* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/28* (2013.01); *C22C 38/34* (2013.01); *C22C 38/38* (2013.01); *C23C 8/26* (2013.01); *B62D 55/06* (2013.01); *E02F 3/7604* (2013.01)

(58) Field of Classification Search
CPC .......... B62D 55/21; C23C 8/26; C22C 38/38; C22C 38/34; C21D 8/005; C21D 9/0068; C21D 1/60
See application file for complete search history.

(56) References Cited

U.S. PATENT DOCUMENTS

| | | |
|---|---|---|
| 5,389,161 A | 2/1995 | Wawra et al. |
| 6,634,725 B2 | 10/2003 | Sugiyama et al. |
| 6,792,665 B2 | 9/2004 | Baugh et al. |
| 7,131,310 B2 | 11/2006 | Easterbrook et al. |
| 7,557,998 B2 | 7/2009 | Nishibata et al. |
| 7,604,304 B2 | 10/2009 | Takayama |
| 8,663,400 B2 | 3/2014 | Omura et al. |
| 8,876,988 B2 | 11/2014 | Chida et al. |
| 8,951,365 B2 | 2/2015 | Hirakami et al. |
| 8,980,022 B2 | 3/2015 | Miyanishi et al. |
| 2003/0111905 A1 | 6/2003 | Takayama |
| 2013/0004261 A1 | 1/2013 | Pattinson et al. |
| 2013/0084205 A1 | 4/2013 | Numata et al. |
| 2015/0061369 A1 | 3/2015 | Thorson et al. |
| 2015/0061374 A1 | 3/2015 | Diekevers et al. |

FOREIGN PATENT DOCUMENTS

| | | |
|---|---|---|
| CN | 101928888 | 12/2010 |
| CN | 203230698 U | 10/2013 |
| EP | 1143025 A1 | 10/2001 |
| EP | 1167561 A2 | 1/2002 |
| EP | 1167561 A3 | 3/2009 |
| EP | 2914756 A1 | 9/2015 |
| JP | 54-121221 A | 9/1979 |
| JP | 55-161055 A | 12/1980 |

(Continued)

OTHER PUBLICATIONS

English Abstract and English Machine Translation of Takeuchi et al. (JP 2006-291310) (Oct. 26, 2006).*

(Continued)

*Primary Examiner* — Jessee R Roe

(74) *Attorney, Agent, or Firm* — Leydig, Voit & Mayer, LTD.

(57) ABSTRACT

A track pin for a track chain assembly includes a body made from a steel alloy. The steel alloy has a composition comprising iron, a nitride-forming element, and silicon. The composition of the steel alloy comprises at least 0.5 percent by weight of silicon. The body includes an external nitrided surface.

19 Claims, 4 Drawing Sheets

(56) References Cited

FOREIGN PATENT DOCUMENTS

| | | | |
|---|---|---|---|
| JP | 1-201424 A | 8/1989 | |
| JP | 7-62492 A | 3/1995 | |
| JP | H08165556 | 6/1996 | |
| JP | 2001-088755 A | 4/2001 | |
| JP | 2002293275 | 10/2002 | |
| JP | 2006-291310 * | 10/2006 | ............... C21D 9/30 |
| JP | 4481522 B2 | 6/2010 | |
| WO | WO 85/03527 A1 | 8/1985 | |
| WO | 9841771 | 9/1998 | |
| WO | WO 2014/068272 A1 | 5/2014 | |

OTHER PUBLICATIONS

Daido Steel: "Stainless Steel Chemical composition (JIS)", Jan. 1, 2005, XP055431233, Retrieved from the Internet: URL:http://www.daido.co.jp/en/products/stainless/sus_jis.pdf.

* cited by examiner

NITRIDED TRACK PIN FOR TRACK CHAIN ASSEMBLY OF MACHINE

CROSS-REFERENCE TO RELATED APPLICATIONS

This patent application is a continuation-in-part of U.S. patent application Ser. No. 14/933,467, filed Nov. 5, 2015, now abandoned, and entitled "Alloy with High Core Hardness Suitable for Rapid Nitriding."

TECHNICAL FIELD

This patent disclosure relates generally to a track chain assembly for a track-type machine and, more particularly, to a track pin for use in a track chain assembly of the machine.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments where creating sufficient traction is problematic, such as those frequently found in the industries identified above. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, drive sprockets, idlers, tensioners, and rollers, for example.

Typical track chain assembly designs include a track pin either fixedly or rotatably connected to a pair of chain links and a bushing rotatably positioned between the links and about the track pin. Such track chain assemblies can operate in extremely adverse environments in which track joints may be exposed to various abrasive mixtures of water, dirt, sand, rock or other mineral or chemical elements. The bearing interface between the track pin and the bushing can encounter high contact stresses which lead to galling failure. Galling is a principal failure mode for track chain assemblies and can limit the life of track chain assemblies in many applications.

Track bushings are conventionally made from carbon steel or low alloy steel that has been either direct hardened or carburized and hardened. When used in combination with this type of track bushing, any bare steel or carburized pin is limited in hardness by the hardening capacity of the carbon in steel. The surface microstructures of a direct hardened or carburized track pin can be similar to the steel bushings; this similarity is believed to limit performance.

To address galling failures, it is known to coat pins with one of several types of hard coatings, such as by using physical vapor deposition (PVD) or chemical vapor deposition (CVD). These coatings are deposited on the surface of the substrate material, and they can create a new structure that is sufficiently different from that of the bushing. These coatings can improve galling resistance. Unfortunately, deposition of these coatings is costly and adherence can be an issue.

Another approach to addressing galling failures is to increase the area of surface contact between contacting components, thereby decreasing the contact stresses and the galling propensity. This option is not desirable because increases in track pin size lead to disproportionate increases in system costs because all other related components must also follow scale and correspondingly increase in size, as well.

Nitriding is an existing heat treatment method that can create very hard thin cases on the surface of nitriding alloys. However, nitriding requires high processing temperatures (over 500° C.) which cause most steels to lose their strength. This results in having a hard case on top of a much softer substrate, which may not have the strength to support the intended service loads of the track chain assembly, including the shear and fatigue loads in large track-type machines, especially large track-type tractors.

U.S. Pat. No. 7,604,304 is entitled, "Crawler, Crawler Pin, Crawler Bush, and Crawler Manufacturing Method," and is directed to a crawler having a crawler pin and a crawler bush having lubrication between the crawler pin and the crawler bush without lowering the strength of the crawler at the running time, thereby to prevent the creak or seizure, as might otherwise be caused at the running time. A metallic sliding member having an excellent wear resistance can be arranged in the clearance between the crawler bush and the crawler pin. The metallic sliding member can be capable of holding lubricating oil and/or a lubricant. In addition, the clearance between the core bush and the crawler pin can be narrowed, so that the resulting structure retains the imbalance load on both the crawler bush and the crawler pin.

There is a continued need in the art to provide additional solutions for a track chain assembly. For example, there is a continued need for a track pin of a track chain assembly which is not only sufficiently strong to support the service loads for which it is intended but also extremely durable to provide an extended useful life of the track chain assembly.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

In an embodiment, the present disclosure describes a track pin for a track chain assembly. The track pin includes a body made from a steel alloy. The steel alloy has a composition comprising iron, a nitride-forming element, and silicon. The composition of the steel alloy comprises at least 0.5 percent by weight of silicon. The body includes an external nitrided surface.

In another embodiment, a track pin for a track chain assembly includes a body made from a steel alloy. The steel alloy has a composition comprising iron and a nitride-forming element. The body is cylindrical with a solid interior and includes an external nitrided surface.

In yet another embodiment, a track chain assembly is described that includes a track pin and a bushing. The track pin defines a longitudinal axis. The track pin includes a body having an external nitrided surface. The body is made from a steel alloy. The steel alloy has a composition comprising iron and a nitride-forming element.

The bushing includes an inner surface that defines a cylindrical bore. The bushing is positioned coaxially around the track pin such that the track pin extends through the cylindrical bore of the bushing. The bushing is rotatable about the longitudinal axis relative to the track pin. The inner surface of the bushing is made from a bushing material. The bushing material is different from the steel alloy from which the body of the track pin is made.

Further and alternative aspects and features of the disclosed principles will be appreciated from the following detailed description and the accompanying drawings. As will be appreciated, the principles related to track pins and track chain assemblies disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

The present disclosure provides a track pin for a track chain assembly of a track-type machine. Examples of track-type machines include machines used for construction, mining, forestry, and other similar industries. In some embodiments, the machine can be a dozer, loader, excavator, or any other on-highway or off-highway vehicle having a track-type undercarriage. The undercarriage can include track chain assemblies adapted to engage the ground, or other surface, to propel the track-type machine.

Embodiments of a track pin constructed according to principles of the present disclosure can include a body made from a steel alloy that comprises a temper-resistant nitriding alloy, one which can maintain sufficient core strength for its intended application even after high temperature tempering. Examples of a suitable alloy include those described in U.S. Pat. No. 5,131,965 and U.S. patent application Ser. No. 14/933,467, which are both incorporated herein by reference in their entireties. By nitriding the body of the track pin, an external surface of the body becomes a very hard nitrided case and the core of the body sufficiently maintains its strength. The nitriding process creates a hardened metal-matrix case with a ceramic "white layer." This "white layer" can be markedly different in structure to the surface microstructure of the track bushing with which the nitrided track pin is paired. In embodiments, the combination of the nitrided track pin's core strength, surface hardness, and dissimilar microstructure (relative to the bushing with which it is paired) can help provide a robust track chain assembly with superior galling resistance and sufficient strength for an extended service life relative to the same track pin which is not nitrided.

Figure 1:
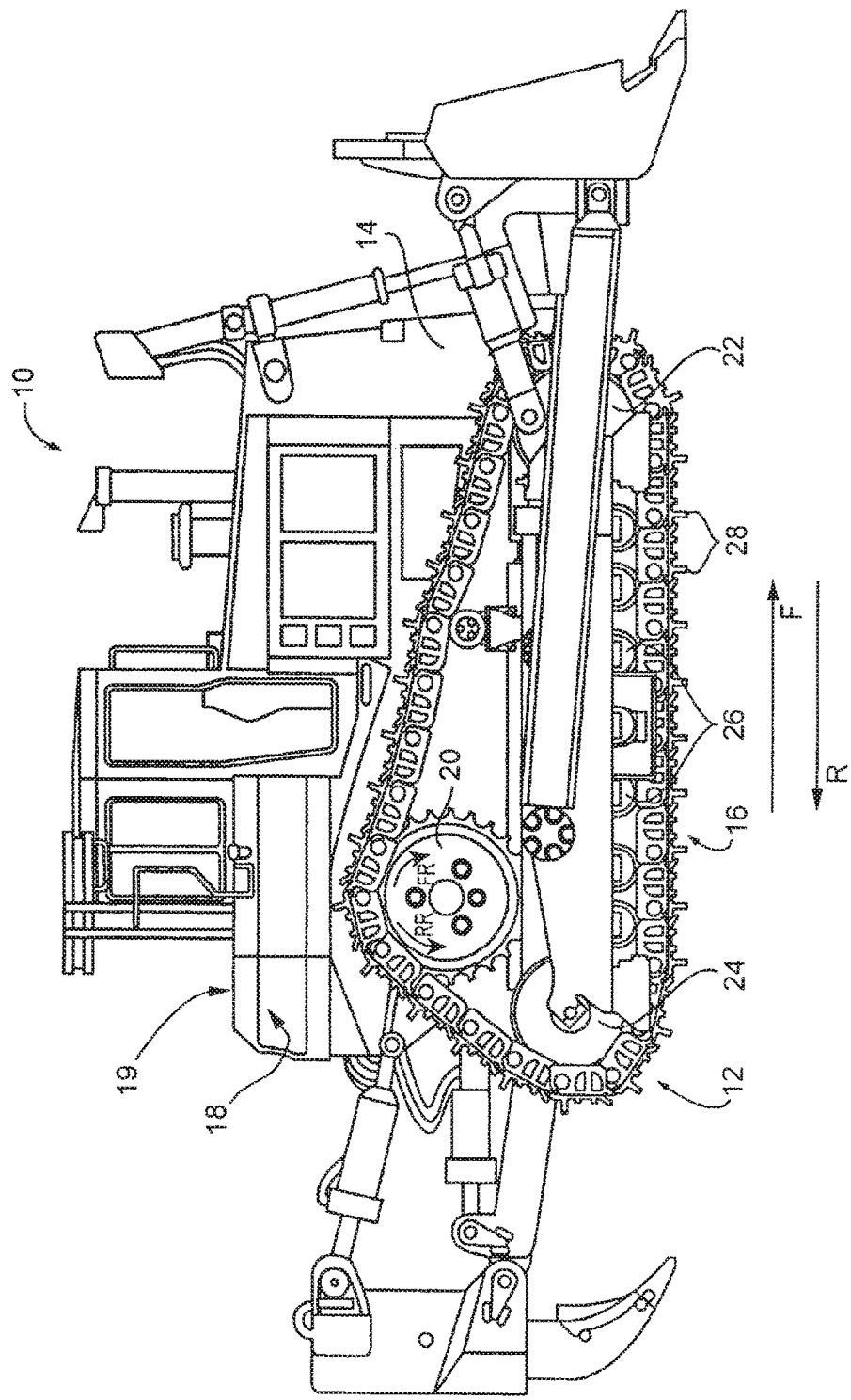
FIG. 1 is a diagrammatic side elevational view of an embodiment of a track-type machine which includes an undercarriage constructed in accordance with principles of the present disclosure.

Turning now to the Figures, there is shown in FIG. 1 an exemplary embodiment of a machine 10 with a track-type undercarriage 12. The machine 10 may also be referenced herein as a track-type machine. In other embodiments, the machine 10 may be any suitable machine with a track-type undercarriage, such as, a dozer, loader, excavator, or any other on-highway or off-highway vehicle.

The machine 10 includes a frame 14 having a first track chain assembly 16 disposed on a first side 18 thereof, and a second track chain assembly (not shown) disposed on a second side 19 thereof. The second side 19 is in opposing relationship to the first side 18. Together, the track assemblies are adapted to engage the ground, or other surface, to propel the machine 10.

It should be appreciated that the track assemblies of the machine 10 may be similar and, further, may represent mirror images of one another. As such, only the first track chain assembly 16 will be described herein. It should be understood that the description of the first track chain assembly 16 is applicable to the second track chain assembly, as well.

The first track chain assembly 16 extends about a plurality of rolling elements such as a drive sprocket 20, a front idler 22, a rear idler 24, and a plurality of track rollers 26. The track chain assembly 16 includes a plurality of ground-engaging track shoes 28 for engaging the ground, or other surface, and propelling the machine 10.

During typical operation of the undercarriage 12, the drive sprocket 20 is driven in a forward rotational direction FR to drive the track chain assembly 16, and thus the machine 10, in a forward direction F, and in a reverse rotational direction RR to drive the track chain assembly 16, and thus the machine 10, in a reverse direction R. The drive sprockets 20 of the undercarriage 12 can be independently operated to turn the machine 10.

While the machine 10 is illustrated in the context of a track-type machine, it should be appreciated that the present disclosure is not thereby limited, and that a wide variety of other machines having tracks are also contemplated within the present context. For example, in other embodiments, the track chain assembly 16 can be included in a conveyor system, as a track for transmitting torque between rotating elements, or in any other application known to those skilled in the art.

Figure 2:
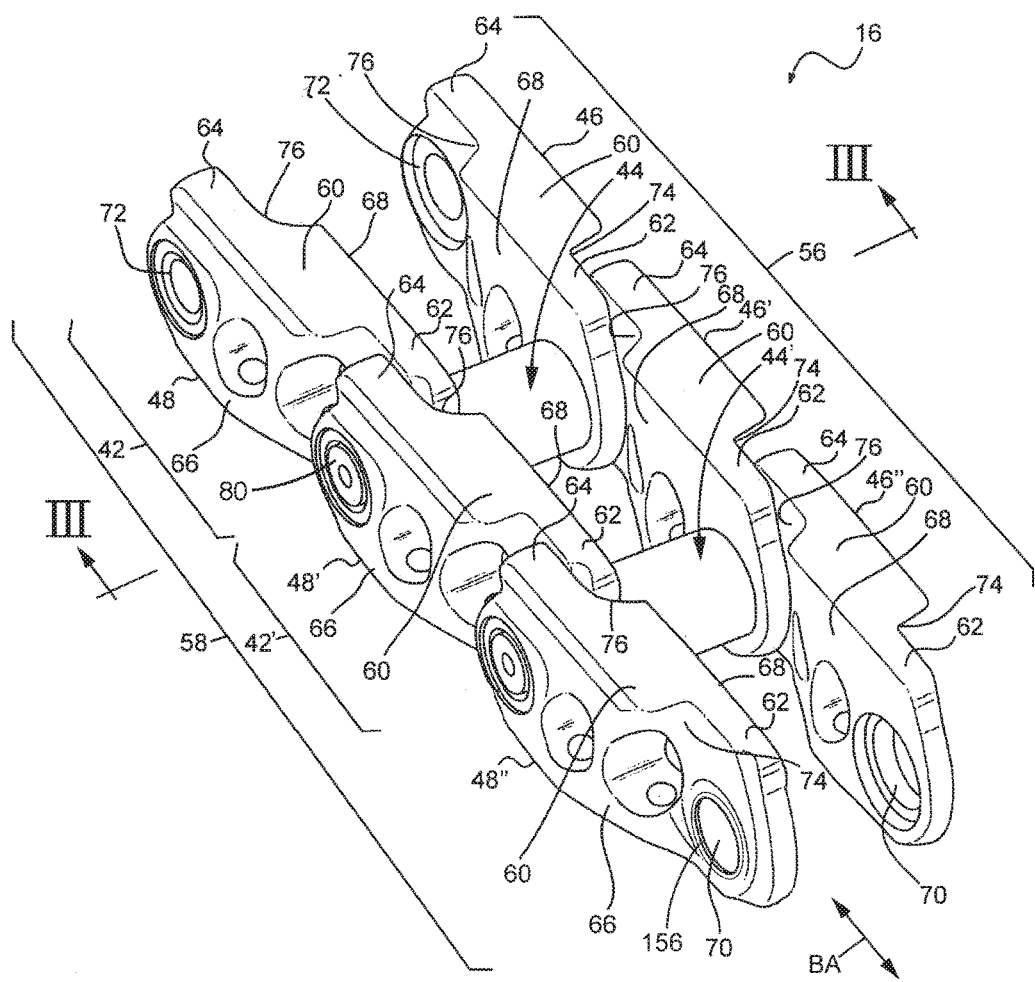
FIG. 2 is a fragmentary, perspective view of a portion of an embodiment of a track chain assembly constructed in accordance with principles of the present disclosure.
Figure 3:
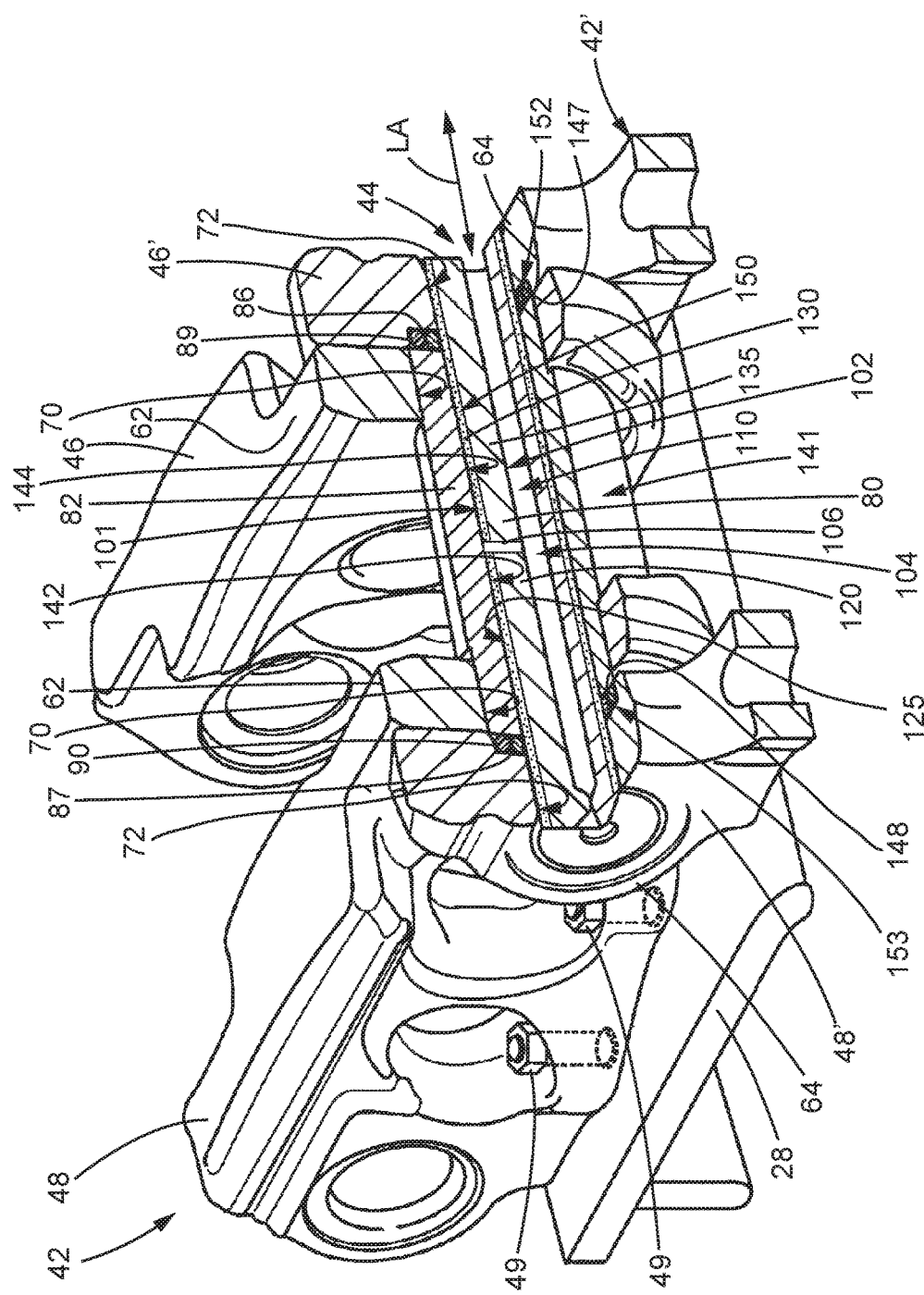
FIG. 3 is a perspective view, in section of an embodiment of a track pin joint assembly of the track chain assembly of FIG. 2.

Referring now to FIG. 2, the first track chain assembly 16, only a portion of which is shown, includes a plurality of track pin joint assemblies 42. Each track pin joint assembly 42 includes a pin assembly 44, an inboard link 46, an outboard link 48, and a track shoe 28 (see FIG. 3) connected to the inboard and outboard links 46, 48 via any suitable technique known to one skilled in the art, such as by a plurality of fasteners 49 as shown in FIG. 3., for example.

Referring to FIG. 2, a number of track pin joint assemblies 42 are mechanically coupled to adjacent track pin joint assemblies 42 so that, when an appropriate number of these track pin joint assemblies 42 are connected together, the track chain assembly 16 is formed. The first track chain assembly 16 has a predetermined length for a given application with opposite ends that are capable of being connected together to form a closed loop. The closed loop is formed by mechanically coupling the opposite ends together to respectively provide an inboard chain 56 of a series of inboard links 46 and an outboard chain 58 of a series of outboard links 48 coupled together via a plurality of pin assemblies 44. In embodiments, a suitable master link assembly, as is known to one skilled in the art, can be used to facilitate the connection of the track pin joint assemblies 42 to form the closed loop. The inboard links 46 and the outboard links 48 can be made from any suitable material, such as, metal, for example.

It should be recognized that the terms "inner" and "outer," in reference to the links 46, 48 of each track pin joint assembly 42 in this example are used merely as descriptors for the orientation shown in the Figures. Other terms, such as, "left" and "right" or "first" and "second," could be interchangeably used as well. It should be understood that these terms are merely convenient labels applied to the different views and are not meant to be limiting in any way.

The inboard links 46 and the outboard links 48 are mirror images of each other. Accordingly, it should be understood that the description of one link 46 is generally applicable to the other link, as well. The inboard link 46 and the outboard link 48 each includes a body 60 having a first end 62, a second end 64, an outer sidewall 66 and an inner sidewall 68. The outer sidewall 66 and the inner sidewall 68 extend along a body axis BA between the first end 62 and the second end 64. The first end 62 and the second end 64 defining a first pin passage 70 and a second pin passage 72, respectively. Each of the first pin passage 70 and the second pin passage 72 extends transversely between the outer sidewall 66 and the inner sidewall 68.

The illustrated inboard and outboard links 46, 48 comprise offset links. The first ends 62 of the inboard and outboard links 46, 48 comprise inwardly offset ends, and the second ends 64 of the inboard and outboard links 46, 48 comprise outwardly offset ends. In the illustrated embodiment, the outer sidewall 66 of the body 60 defines a first offset recess 74 at the first end 62 of the body 60, and the inner sidewall 68 of the body 60 defines a second offset recess 76 at the second end 64 of the body 60. The inwardly offset ends 62 of the inboard link 46 and the outboard link 48 of each track pin joint assembly 42 can be rotatably mounted relative to a track pin 80 of the pin assembly 44 thereof. The outwardly offset ends 64 of the inboard link 46' and the outboard link 48' of each track pin joint assembly 42' can be fixedly coupled with the track pin 80 of the pin assembly 44 of an adjacent track pin joint assembly 42. In other embodiments, the links 46, 48 of the track chain assembly 16 can have a different configuration, as one skilled in the art would recognize.

Referring to FIG. 3, the pin assembly 44 is illustrated according to one of several possible embodiments of the present disclosure. The illustrated pin assembly 44 includes the track pin 80, a bushing 82, a pair of thrust rings 86, 87, and a pair of seal assemblies 89, 90.

The track pin 80 defines a longitudinal axis LA. The track pin 80 extends through the first pin passage 70 of the inboard and the outboard links 46, 48 of the track pin joint assembly 42 and is positioned at least partially in the second pin passage 72 of the inboard and the outboard links 46', 48' of the adjacent track pin joint assembly 42'. The bushing 82 is positioned coaxially around the track pin 80 and is rotatable about the longitudinal axis LA relative to the track pin 80. As shown, the inwardly offset ends 62 of the inboard and the outboard links 46, 48 are fixedly connected to the bushing 82, which can be at least partially positioned within the first pin passage 70 of the inwardly offset ends 62 of the inboard and the outboard links 46, 48. Similarly, the outwardly offset ends 64 of the inboard and outboard links 46', 48' of the adjacent track pin joint assembly 42' are secured to the track pin 80, which can be at least partially positioned within the second pin passage 72 of the inboard and the outboard links 46', 48' of the adjacent track pin joint assembly 42'.

For example, the bushing 82 and the track pin 80 can be secured to the respective inboard and the outboard links 46, 48; 46', 48' by way of press-fits. Specifically, the bushing 82 can be press-fit into the first pin passage 70 of the inwardly offset ends 62 of the inboard and outboard links 46, 48, and the track pin 80 can be press-fit into the second pin passage 72 of the outwardly offset ends 64 of the inboard and outboard links 46', 48' of the adjacent track pin joint assembly 42'. In other embodiments, any suitable technique for securing the components together can be used, such as, by using welds, snap rings, or other mechanisms known in the art.

Accordingly, the inwardly offset ends 62 mounted to the bushing 82 can pivot relative to the outwardly offset ends 64 mounted to the track pin 80 as the track pin joint assembly 42 rotates. In order to facilitate such rotation, in embodiments, a lubricant can be deposited between the bushing 82 and the track pin 80.

In the illustrated embodiment, the track pin 80 includes an outer surface 101 and an inner surface 102 defining a cylindrical bore 104 extending therethrough along the longitudinal axis LA and concentrically disposed about the longitudinal axis LA. The track pin 80 defines a cross bore 106 that extends from the outer surface 101 thereof inwardly to the bore 104 in a direction perpendicular to the central longitudinal axis LA for distributing lubricant stored in the central bore of the pin.

One or more plugs (not shown) can be positioned in the bore 104 of the track pin 90 to form a fluid reservoir 110 in the bore 104 thereof. In use, fluid disposed within the fluid reservoir 110 is in fluid communication with and advanced through the cross bore 106 to the outer surface 101 of track pin 90. Once disposed on the outer surface 101, the fluid facilitates the rotation of the bushing 82 about the longitudinal axis LA relative to the track pin 80. Retention of the fluid within the fluid reservoir 110 is assisted by the seal assemblies 89, 90 which are respectively sealingly engaged with the inboard link 46' and the bushing 82 and the outboard link 48' and the bushing 82 while also helping to prevent debris (e.g. sand, dirt, etc) from entering between the bushing 82 and the track pin 80.

In embodiments of a track pin constructed according to principles of the present disclosure, the track pin 80 includes a body 120 made from a steel alloy having a composition comprising iron and a nitride-forming element. The body 120 includes an external nitrided surface 125. In embodiments, the body 120 of the track pin 80 is made from a steel alloy that comprises a temper-resistant nitriding alloy that can maintain sufficient core strength for its intended application even after high temperature tempering. In embodiments, the body 120 of the track pin 80 can be made from a steel alloy as described in U.S. Pat. No. 5,131,965 or U.S. patent application Ser. No. 14/933,467, which are both incorporated herein by reference in their entireties.

In embodiments, the body 120 of the track pin 80 can be from any suitable steel alloy that is configured to produce the external nitrided surface 125 after being subjected to a nitriding process. For example, in embodiments, the steel alloy has a composition comprising iron, a nitride-forming element, and silicon. In embodiments, the composition of the steel alloy comprises at least 0.5 percent by weight of silicon. In embodiments, the composition of the steel alloy comprises between 0.5 percent and 4 percent by weight of silicon, between 0.5 percent and 2 percent by weight of silicon in other embodiments, and between 1 percent and 3 percent by weight of silicon in still other embodiments. In embodiments, the composition of the steel alloy includes a combination of at least one nitride-forming element and silicon sufficient to provides the body 120 of the track pin 80 with the desired core hardness without additions of significant amounts of other expensive alloy elements, such as Ni, Mo and Ti. In embodiments, the steel alloy has a composition comprising iron, carbon, a nitride-forming element, and at least 0.5 percent by weight of silicon. In embodiments, the composition of the steel alloy comprises between 0.2 percent and 0.4 percent by weight of carbon. In embodiments, the composition of the steel alloy comprises between 0.5 percent and 1.6 percent by weight of manganese. In embodiments, the composition of the steel alloy comprises up to 2.5 percent by weight of chromium, up to 0.3 percent by weight of vanadium, and up to 0.3 percent by weight of aluminum.

In embodiments, the steel alloy from which the body 120 is made can have a chemical composition within the ranges as set forth in Table I:

TABLE I

| Element | Amount (by weight %) |
|---|---|
| Carbon | 0.2-0.4 |
| Manganese | 0.5-1.6 |
| Silicon | 0.5-2.0 |
| Chromium | 0.4-1.5 |
| Vanadium | 0.03-2.0 |
| Aluminum | 0.07-2.0 |
| Iron (and residual elements) | Balance |

The presence of carbon in the composition of the steel alloy from which the body 120 of the track pin 80 is made can help contribute to the attainable hardness level as well as the depth of hardening of steel and can help provide an adequate response to nitriding. In embodiments, the composition of the steel alloy from which the body 120 of the track pin 80 is made includes carbon in an amount of at least 0.20% or higher by weight. In embodiments, the amount of carbon may be between 0.24% and 0.34% by weight.

The presence of manganese in the composition of the steel alloy from which the body 120 of the track pin 80 is made can help contribute to deep hardenability and can help provide core hardness that is sufficient for the intended application of the track pin 80. In embodiments, the composition of the steel alloy from which the body 120 of the track pin 80 is made includes manganese in an amount of at least 0.5% or higher by weight. To maintain uniformity of response to heat treatment, a lower amount of manganese of between 0.5% and 1.5% by weight can be used, and between 1.0% and 1.3% by weight in yet other embodiments.

The presence of chromium in the composition of the steel alloy from which the body 120 of the track pin 80 is made can help contribute to the hardenability of the body 120 and nitride formation, thereby enhancing nitride response. In embodiments, the composition of the steel alloy from which the body 120 of the track pin 80 is made includes chromium in an amount of at least 0.4% or higher by weight. In embodiments, a narrower range of chromium from 0.9% to 1.2% by weight can be used.

The presence of aluminum in the composition of the steel alloy from which the body 120 of the track pin 80 is made can help contribute to hardenability and nitride formation. In embodiments, the composition of the steel alloy from which the body 120 of the track pin 80 is made includes aluminum in an amount of at least 0.07% or higher by weight. In order to help avoid case brittleness, the composition of the steel alloy from which the body 120 of the track pin 80 is made includes aluminum in a range between 0.07% and 1.0% by weight in some embodiments, and in a range between 0.07% and 0.3% by weight in yet other embodiments.

In embodiments, the composition of the steel alloy from which the body 120 of the track pin 80 is made includes vanadium in an amount of at least 0.03% or higher by weight to help enhance case and core hardness. In order to reduce costs, the composition of the steel alloy from which the body 120 of the track pin 80 is made includes vanadium in a range between 0.03% and 0.3% by weight in some embodiments, in a range between 0.05% and 0.1% by weight in yet other embodiments, and in a range between 0.1% and 0.2% by weight in still other embodiments. Accordingly, in embodiments, the steel alloy from which the body 120 is made can have a chemical composition within the following ranges: between 0.2 percent and 0.4 percent by weight of carbon, between 0.5 percent and 1.6 percent by weight of manganese, between 0.5 percent and 2.0 percent by weight of silicon, between 0.4 percent and 1.5 percent by weight of chromium, between 0.03 percent and 0.3 percent by weight of vanadium, between 0.07 percent and 0.3 percent by weight of aluminum, and iron in a balance amount.

In embodiments, the composition of the steel alloy from which the body 120 of the track pin 80 is made includes nickel and molybdenum each in an amount of 1.0% or less by weight. Nickel and/or molybdenum can be added in an amount sufficient to improve toughness and/or hardenability of the steel alloy as a function of the size and geometry of the track pin 80. In embodiments, the composition of the steel alloy from which the body 120 of the track pin 80 is made includes nickel and molybdenum in a combined amount of 1.0% or less by weight. In order to further reduce costs, the composition of the steel alloy from which the body 120 of the track pin 80 is made includes nickel and molybdenum each in an amount of 0.1% or less by weight in some embodiments, and each in an amount of 0.01% or less by weight in yet other embodiments. In embodiments, the composition of the steel alloy from which the body 120 of the track pin 80 is made is substantially free of nickel and molybdenum except for trace impurities.

In embodiments, the composition of the steel alloy from which the body 120 of the track pin 80 is made includes titanium and niobium each in an amount sufficient to help reduce grain coarsening during hot working. When added with molybdenum and/or vanadium, titanium and niobium form carbonitrides with nitrogen and carbon in the steel, and are effective in enhancing the core hardness and the surface hardness as well. In embodiments, the composition of the steel alloy from which the body 120 of the track pin 80 is made includes titanium in an amount of 0.05% by weight, 0.01% or less by weight in other embodiments, and a combined amount of titanium and niobium of 0.01% or less by weight in still other embodiments.

In embodiments, the composition of the steel alloy from which the body 120 of the track pin 80 is made includes phosphorus in an amount of 0.03% or less by weight, which can be present in steel as an impurity. In order to help avoid deterioration in toughness or corrosion resistance, the composition of the steel alloy from which the body 120 of the track pin 80 is made includes phosphorus in an amount of 0.01% or less by weight in yet other embodiments.

In embodiments, the composition of the steel alloy from which the body 120 of the track pin 80 is made includes iron in a balance amount. It will be understood that the "balance amount" of iron can include residual amounts of elements, such as impurities, which can be present in small amounts within commercially-recognized allowable amounts.

In other embodiments, the steel alloy from which the body 120 of the track pin 80 is made can have a chemical composition within the ranges as set forth in Table II:

TABLE II

| Element | Amount (by weight %) |
|---------|----------------------|
| Carbon | 0.26-0.37 |
| Manganese | 0.5-1.0 |
| Silicon | 1.0-3.0 |
| Chromium | 1.5-2.5 |
| Molybdenum | 0.3-1.0 |
| Vanadium | 0.05-0.2 |
| Titanium | 0.03-0.1 |
| Aluminum | 0.01-0.03 |
| Phosphorus | Less than 0.025 |
| Sulfur | Less than 0.025 |
| Nitrogen | At least 0.005 |
| Iron (and residual elements) | Balance |

In some of such embodiments, the composition of the steel alloy from which the body 120 of the track pin 80 is made comprises: between 0.26 percent and 0.37 percent by weight of carbon, between 0.5 percent and 1.0 percent by weight of manganese, between 1.0 percent and 3.0 percent by weight of silicon, between 1.5 percent and 2.5 percent by weight of chromium, between 0.3 percent and 1.0 percent by weight of molybdenum, between 0.05 percent and 0.2 percent by weight of vanadium, between 0.03 percent and 0.1 percent by weight of titanium, between 0.01 percent and 0.03 percent by weight of aluminum, less than 0.025 percent by weight of phosphorous, less than 0.025 percent by weight of sulfur, between 0.005 percent and 0.013 percent by weight of nitrogen, and iron in a balance amount.

In embodiments, the track pin 80 can be made using any suitable technique, such as by being formed to a desired shape by forging or rolling. The formed track pin can be hardened by heating to a temperature of about 870° C. (1600° F.) for a period of about one hour and then quenched in either water or oil to complete transformation of the ferrite and pearlite microstructure to martensite. After tempering to precipitate and agglomerate the carbide particles and thereby provide improved toughness, the formed track pin can be machined (e.g., to provide the cylindrical bore 104 and the cross bore 106) to a desired final dimension and then nitrided. Nitriding is a thermo-chemical process by which the surface of the outer surface 101 of the track pin 80 is enriched with nitrogen to form alloy nitrides and form a nitride layer 130. In embodiments, the track pin 80 can be subjected to any suitable nitriding technique during the manufacture of the track pin 80.

By nitriding the body 120 of the track pin 80, the outer surface 101 of the track pin 80 becomes the external nitrided surface 125 of the body such that the body 120 has a very hard nitrided case and the core of the body sufficiently maintains its strength. The nitriding process creates a hardened metal-matrix case in the form of the nitride layer 130, commonly referred to as a ceramic "white layer." The nitride layer 130 can be markedly different in structure to the surface microstructure of a core 135 of the body 120 of the track pin 80 (and also different from the material structure of the bushing 82 with which the nitrided track pin 80 is paired). The hardness and the different microstructure of the nitride layer 130 can improve galling resistance. In embodiments, the nitride layer 130, or white layer, provides galling resistance while the core of the body 120 retains sufficient strength after nitriding the track pin 80 such that the track pin 80 performs functionally as if it were a larger size than what it actually is. In embodiments, the nitride layer 130, or white layer can comprise a near single phase, such as, a gamma prime white layer with little (if any) epsilon, for example. In embodiments, the nitride layer 130, or white layer can be at least five microns thick, and at least seven microns thick in other embodiments.

Nitriding the outer surface 101 of the track pin 80 can form alloy nitrides which improve the wear resistance of the track pin 80 and form the nitride layer 130 which can improve the corrosion resistance of the track pin 80. In embodiments, nitriding the track pin 80 can increase its surface hardness, wear resistance, resistance to certain types of corrosion, and compressive surface stresses, which improve the fatigue resistance of the track pin 80.

In embodiments, after alloying a steel alloy steel according to principles of the present disclosure, the steel can be hot deformed by forging or hot-rolling and rough machined. The steel alloy is quenched and tempered to a specific core hardness, and then finish machined to form the track pin 80. Subsequently, the track pin 80 is nitrided. The track pin 80 can be lapped or lightly ground thereafter to conform to predetermined specifications for the track pin 80.

Any suitable nitriding technique known to one skilled in the art can be used for nitriding the track pin 80, such as gas nitriding, salt bath nitriding, and plasma nitriding, for example. In gas nitriding, the donor is a nitrogen gas, usually anhydrous ammonia (NH3), which is why it is sometimes known as ammonia nitriding. In embodiments, nitriding the track pin 80 can be carried out in an atmosphere containing partially dissociated ammonia gas at a temperature in a range of 400° C. to 600° C. When ammonia comes into contact with the heated track pin, it disassociates into nitrogen and hydrogen. The nitrogen then diffuses onto the outer surface 101 of the track pin, creating the nitride layer 130 which includes the external nitrided surface 125. The thickness and phase constitution of the resulting nitride layer 130 can be selected and the process can be modified for the particular properties desired for the intended application of the track pin 80. It should be noted that although the nitride layer 130 is shown in FIG. 3 as being present only at the outer surface 101 of the tack pin 80, this is done for illustrative purposes only. It should be understood that the nitride layer 130 can be present at any site on the track pin 80 at which the nitriding process is undertaken.

In embodiments, the core hardness of the body 120 of the track pin 80 can be measured at 0.5 mm below the external nitrided surface 125. In embodiments, the body 120 of the track pin 80 has a core hardness, measured at 0.5 mm below the external nitrided surface 125, of at least $R_c$ 40, at least $R_c$ 42 in other embodiments, and at least $R_c$ 45 in yet other embodiments. In embodiments, the external nitride surface 125 of the track pin 80 has a surface hardness of at least $R_c$ 60, at least $R_c$ 62 in other embodiments, and at least $R_c$ 65 in still other embodiments. It should be understood that the hardness measurement can comprise an average of at least three measurements.

Referring to FIG. 3, the bushing 82 includes an outer surface 141 that is generally cylindrical and an inner surface 142 that defines a passage in the form of a cylindrical bore 144 therethrough. The bushing 82 is positioned coaxially around the track pin 80 such that the track pin 80 extends through the cylindrical bore 144 of the bushing 82. The bushing 82 is rotatable about the longitudinal axis LA relative to the track pin 80. First and second axial end faces 147, 148 of the bushing 82 are respectively disposed adjacent to the second ends 64 of the inboard and outboard links 46', 48' of the adjacent track pin joint assembly 42', respectively.

The outer surface 141 of the bushing 82 is configured to engage the drive sprocket 20 that propels the first track chain assembly 16. The bushing 82 can rotate about the longitudinal axis LA relative to the track pin 80 when it engages the drive sprocket 20, thereby reducing wear on the bushing 82 caused by the interaction between the bushing 82 and the drive sprocket 20.

In embodiments, the bushing 82 includes a case-hardened surface 150 which includes the inner surface 142 (and, in embodiments, the outer surface 141). In the illustrated embodiment, the case-hardened surface 150 is in contacting relationship with the external nitrided surface 125 of the track pin 80. In embodiments, the case-hardened surface 150 of the bushing 82 can be produced by any suitable technique, such as by being produced by one of direct hardening and carburizing, for example.

In embodiments, the inner surface 142 of the bushing 82 is made from a bushing material. In embodiments, the bushing material is different from the steel alloy from which the body 120 of the track pin 80 is made. In the illustrated embodiment, the entire bushing 82 is made from the bushing material. In embodiments, the bushing material can be any suitable material, such as a suitable steel, including SAE 15B21, SAE 15B26, or SAE 1060, for example. The nitrided layer 130 of the track pin 80 can be structurally different from the surface microstructure of the inner surface 142 of the bushing 82 such that the dissimilar microstructure (relative to the bushing 82 with which it is paired) can help provide good galling resistance for an extended service life for the tack pin 80 relative to the same track pin which is not nitrided.

In other embodiments, one or more different bushings can be used in the track pin joint assembly 42. For example, in embodiments, the outer surface 141 of the bushing 82 can define a lobed surface, such as is shown and described in U.S. Patent Application Publication No. 2010/0139993 for a "Lobed Bushing For Track Assembly and Track-Type Machine Using Same," which is incorporated in its entirety herein by this reference. In yet other embodiments, the bushing 82 can have a different shape and configuration as known in the art. In yet other embodiments, the track pin joint assembly 42 can include an inner and an outer bushing which have a configuration as known in the art.

The components of the track pin joint assembly 42 can define a plurality of annular seal cavities 152, 153 that are concentrically disposed about the longitudinal axis LA of the track pin 80. Each seal cavity 152, 153 can be adapted to respectively house therein one of the seal assemblies 89, 90 which are adapted sealingly engaging relatively rotatable components of the track pin joint assembly 42. In other embodiments of a track pin joint assembly, other components (such as, the bushing 82, for example) can define suitable seal cavities.

The thrust rings 86, 87 can be adapted to limit the axial load placed on the seal assemblies 89, 90, respectively. The seal assemblies 89, 90 are positioned radially outward of the thrust rings 86, 87, respectively, and provide a running seal between the outboard and inboard links 48, 46 and the bushing 82 to retain lubricant in the fluid reservoir 110.

In other embodiments, a track chain assembly according to principles of the present disclosure can include other components and have different arrangements. For example, in other embodiments, the track chain assembly can include a pin cartridge assembly with sleeve bearings and other components as shown and described in U.S. Patent Application Publication No. 2006/0284485, which is incorporated in its entirety herein by this reference. Further, it is contemplated that a variety of track link designs can be used with a track pin assembly constructed according to principles of the present disclosure. For example, in embodiments, the inboard and outboard links can comprise offset links having an S-shape with a different configuration than that shown in FIGS. 2 and 3 or can comprise straight links as known to those skilled in the art.

Figure 4:
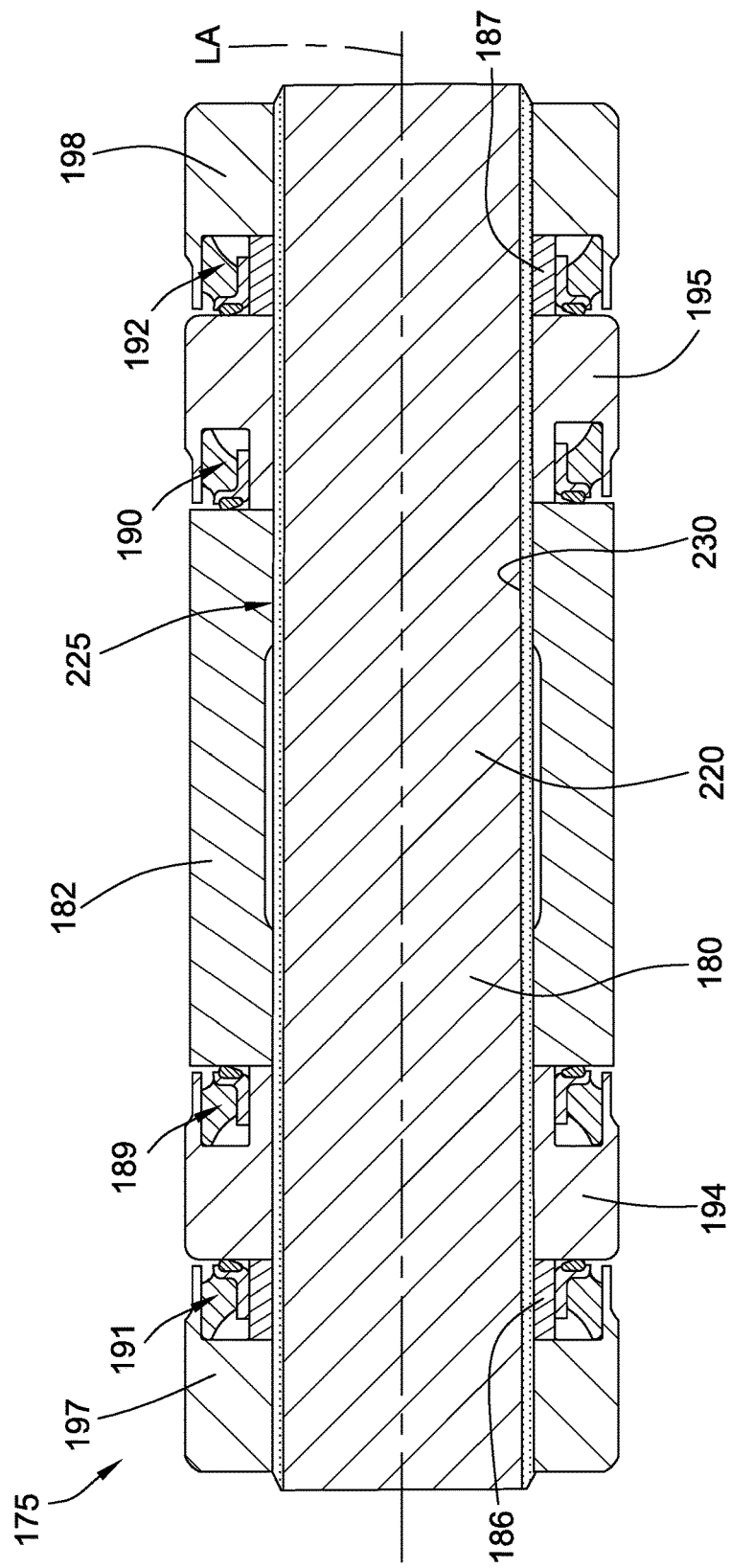
FIG. 4 is a longitudinal cross-sectional view of an embodiment of a pin cartridge assembly constructed according to principles of the present disclosure.

Referring to FIG. 4, a track pin cartridge assembly 175 is illustrated according to one of several possible embodiments following principles of the present disclosure. The illustrated track pin cartridge assembly 175 includes a track pin 180; a bushing 182; first and second thrust rings 186, 187; a plurality of seal assemblies 189, 190, 191, 192; first and second bearing members 194, 195; and first and second collars 197, 198. The track pin cartridge assembly 175 is arranged with the bushing 182 disposed between the first and second bearing members 194, 195, which, in turn, are respectively disposed between the first collar 197 and the bushing 182 and the second collar 198 and the bushing 182.

The track pin 180 defines a longitudinal axis LA. The bushing 182 and the first and second bearing members 194, 195 are rotatably positioned about the track pin 180 such that the bushing 182 and the first and second bearing members 194, 195 are independently rotatable relative the track pin 180 about the longitudinal axis LA. The first and second collars 197, 198 are respectively positioned at the ends of the track pin 180 and are press fit with the track pin 180 such that the first and second collars 197, 198 are rotatively coupled with the track pin 180.

The first thrust ring 186 is disposed between the first collar 197 and the first bearing member 194 and is adapted to transmit axial loads therebetween. The second thrust ring 187 is similarly disposed between the second collar 198 and the second bearing member 196 and is adapted to transmit axial loads therebetween.

The components of the track pin cartridge assembly 175 can define a plurality of annular seal grooves or cavities that are concentrically disposed about the longitudinal axis LA of the track pin 180. Each seal cavity can be adapted to house therein one of the seal assemblies 189, 190, 191, 192 for sealingly engaging relatively rotatable components of the track pin cartridge assembly 175.

The illustrated track pin cartridge assembly 175 includes four seal assemblies 189, 190, 191, 192. A pair of seal assembles 189, 190 is respectively disposed between the bushing 182 and the first bearing member 194 and between the bushing 182 and the second bearing member 195. Another pair of seal assemblies 191, 192 is respectively disposed between the first and second bearing members 194, 195 and the first and second collars 197, 198. The first and second collars 197, 198 can be positioned with respect to the ends of the track pin 180 such that the seal assemblies 189, 190, 191, 192 of the track pin cartridge assembly 175 are compressively engaged between the respective adjacent components to sealingly contact the sealing surfaces of the adjacent members such that a running fluid-tight seal is formed therebetween.

Other approaches to providing galling resistance and adequate strength include increasing the size of the track pin. However, increases in track pin size result in increased pin costs and disproportionately large increases in system costs, so it is not desirable to increase component sizes unnecessarily.

The illustrated track pin 180 includes a body 220 made from a steel alloy. In embodiments, the steel alloy has a composition comprising iron and a nitride-forming element. The body 220 is cylindrical with a solid interior and includes an external nitrided surface 225 which is part of a nitride layer 230 formed by nitriding the track pin 180. In embodiments, the body 220 includes a solid interior such that the body 220 is substantially free of interior passages which are designed to act as a fluid reservoir for lubricant. By omitting the interior fluid reservoir within the track pin 180, the diameter of the track pin can be reduced in some embodiments such that the volume required for use by the track pin 180 can be reduced relative to a similar track pin that includes a fluid reservoir defined therein. The spacing savings that can be obtained with such embodiments can be used to decrease the overall size of the track pin cartridge assembly 175 (and help obtain cost savings) and/or to increase the size of related components.

In embodiments, the body 220 of the track pin 180 can be made from any suitable steel alloy discussed herein in connection with the track pin 80 of FIG. 3. For example, in embodiments, the steel alloy from which the body 220 of the track pin 180 is made has a composition comprising iron, carbon, and silicon, the steel alloy comprising between 0.5 percent and 4 percent by weight of silicon. In embodiments, the composition of the steel alloy from which the body 220 of the track pin 180 is made has a composition comprising between 0.5 percent and 1.6 percent by weight of manganese and between 0.2 percent and 0.4 percent by weight of carbon. The track pin 180 of FIG. 4 can be similar in other respects to the track pin 80 of FIG. 3.

INDUSTRIAL APPLICABILITY

The industrial applicability of the embodiments of a track chain assembly and a track pin described herein will be readily appreciated from the foregoing discussion. At least one embodiment of the disclosed track pins may be used for a track chain assembly. At least one embodiment of the disclosed track pins can be used in an undercarriage of a track-type machine. An exemplary embodiment discloses track pin having a nitrided body wherein the body is made from a temper-resistant nitriding alloy.

Embodiments of a track pin constructed according to principles of the present disclosure can exhibit superior shear strength, fatigue strength, and galling resistance compared to a track pin made form a similar material but that is not subjected to nitriding. In embodiments, a track pin constructed according to principles of the present disclosure can be smaller than a conventional track pin yet provide the same strength, thereby freeing up space and weight to better optimize the track system or reduce the overall system size and cost.

Embodiments of a track pin and a track chain assembly according to principles of the present disclosure may find potential application in any machine, such as a track-type tractor, which utilizes a track-type undercarriage. Yet further, the present disclosure may be applicable to track chain assemblies in which the components are subject to significant wear. Such machines may include, but are not limited to, dozers, loaders, excavators, or any other on-highway or off-highway vehicles or stationary machines that utilize a track assembly, as described herein.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for the features of interest, but not to exclude such from the scope of the disclosure entirely unless otherwise specifically indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A track pin for a track chain assembly, the track pin comprising:
    a body, the body being made from a steel alloy, the steel alloy having a composition comprising iron, a nitride-forming element, and silicon, the composition of the steel alloy comprising at least 0.5 percent by weight of silicon;
    wherein the body includes an external nitrided surface.

2. The track pin according to claim 1, wherein the composition of the steel alloy comprises between 0.5 percent and 4 percent by weight of silicon.

3. The track pin according to claim 1, wherein the composition of the steel alloy comprises between 0.5 percent and 2 percent by weight of silicon.

4. The track pin according to claim 1, wherein the composition of the steel alloy comprises between 1 percent and 3 percent by weight of silicon.

5. The track pin according to claim 1, wherein the composition of the steel alloy comprises between 0.2 percent and 0.4 percent by weight of carbon.

6. The track pin according to claim 5, wherein the composition of the steel alloy comprises between 0.5 percent and 1.6 percent by weight of manganese.

7. The track pin according to claim 6, wherein the composition of the steel alloy comprises up to 2.5 percent by weight of chromium, up to 0.3 percent by weight of vanadium, and up to 0.3 percent by weight of aluminum.

8. The track pin according to claim 1, wherein the composition of the steel alloy comprises:
    between 0.2 percent and 0.4 percent by weight of carbon,
    between 0.5 percent and 1.6 percent by weight of manganese,
    between 0.5 percent and 2.0 percent by weight of silicon,
    between 0.4 percent and 1.5 percent by weight of chromium,
    between 0.03 percent and 0.3 percent by weight of vanadium,
    between 0.07 percent and 0.3 percent by weight of aluminum, and
    iron in a balance amount.

9. The track pin according to claim 1, wherein the composition of the steel alloy comprises:
    between 0.26 percent and 0.37 percent by weight of carbon,
    between 0.5 percent and 1.0 percent by weight of manganese,
    between 1.0 percent and 3.0 percent by weight of silicon,
    between 1.5 percent and 2.5 percent by weight of chromium, between 0.3 percent and 1.0 percent by weight of molybdenum, between 0.05 percent and 0.2 percent by weight of vanadium, between 0.03 percent and 0.1 percent by weight of titanium, between 0.01 percent and 0.03 percent by weight of aluminum, less than 0.025 percent by weight of phosphorous, less than 0.025 percent by weight of sulfur, between 0.005 percent and 0.013 percent by weight of nitrogen, and iron in a balance amount.

10. The track pin according to claim 1, wherein the body of the track pin has a core hardness of at least $R_c$ 40 measured at 0.5 mm below the external nitrided surface.

11. The track pin according to claim 1, wherein the external nitrided surface of the track pin has a surface hardness of at least $R_c$ 60.

12. A track pin for a track chain assembly, the track pin comprising:
a body, the body being made from a steel alloy, the steel alloy having a composition comprising iron, carbon, 0.5 percent and 4 percent by weight of silicon, and a nitride-forming element;
wherein the body is cylindrical with a solid interior and includes an external nitrided surface.

13. The track pin according to claim 12, wherein the composition of the steel alloy comprises between 0.5 percent and 1.6 percent by weight of manganese and between 0.2 percent and 0.4 percent by weight of carbon.

14. A track chain assembly comprising:
a track pin, the track pin defining a longitudinal axis, the track pin including a body having an external nitrided surface, the body being made from a steel alloy, the steel alloy having a composition comprising iron and a nitride-forming element;
a bushing, the bushing including an inner surface, the inner surface defining a cylindrical bore, the bushing being positioned coaxially around the track pin such that the track pin extends through the cylindrical bore of the bushing, the bushing being rotatable about the longitudinal axis relative to the track pin, wherein the inner surface of the bushing is made from a bushing material, the bushing material being different from the steel alloy from which the body of the track pin is made.

15. The track chain assembly according to claim 14, wherein the bushing includes a case-hardened surface, the case-hardened surface in contacting relationship with the external nitrided surface of the track pin.

16. The track chain assembly according to claim 15, wherein the case-hardened surface of the bushing is produced by one of direct hardening and carburizing.

17. The track chain assembly according to claim 14, wherein the steel alloy from which the body of the track pin is made has a composition comprising iron, carbon, and silicon, the steel alloy comprising between 0.5 percent and 4 percent by weight of silicon.

18. The track chain assembly according to claim 17, wherein the composition of the steel alloy comprises between 0.5 percent and 1.6 percent by weight of manganese and between 0.2 percent and 0.4 percent by weight of carbon.

19. The track chain assembly according to claim 18, wherein the composition of the steel alloy comprises up to 2.5 percent by weight of chromium, up to 0.3 percent by weight of vanadium, and up to 0.3 percent by weight of aluminum.

* * * * *